(12) United States Patent
Marc (10) Patent No.: US 9,878,474 B2
(45) Date of Patent: Jan. 30, 2018

(54) SYSTEM AND METHOD FOR MAKING HOLLOW FOAM BALLS AND OTHER MOLDED OBJECTS

(71) Applicant: NOVATION IQ LLC, Lenexa, KS (US)

(72) Inventor: Michel Marc, Lenexa, KS (US)

(73) Assignee: NOVATION IQ LLC, Lenexa, KS (US)

(*) Notice: Subject to any disclaimer, the term of this patent is extended or adjusted under 35 U.S.C. 154(b) by 271 days.

(21) Appl. No.: 14/729,654

(22) Filed: Jun. 3, 2015

(65) Prior Publication Data

US 2016/0354954 A1  Dec. 8, 2016

(51) Int. Cl.
| | |
|---|---|
| *B29C 44/02* | (2006.01) |
| *B29C 44/08* | (2006.01) |
| *B29C 44/56* | (2006.01) |
| *B29C 35/12* | (2006.01) |
| *B29K 21/00* | (2006.01) |
| *B29L 22/00* | (2006.01) |
| *B29L 31/54* | (2006.01) |
| *B29K 27/06* | (2006.01) |

(52) U.S. Cl.
CPC .............. *B29C 44/02* (2013.01); *B29C 35/12* (2013.01); *B29C 44/08* (2013.01); *B29C 44/569* (2013.01); *B29K 2021/00* (2013.01); *B29K 2027/06* (2013.01); *B29L 2022/00* (2013.01); *B29L 2031/546* (2013.01)

(58) Field of Classification Search
None
See application file for complete search history.

(56) References Cited

U.S. PATENT DOCUMENTS

| | | | | |
|---|---|---|---|---|
| 2,881,850 | A | * 4/1959 | Bonn | H04R 1/288 181/153 |
| 4,265,238 | A | 5/1981 | Marc | |
| 4,436,276 | A | * 3/1984 | Donahue | B29C 33/123 249/91 |
| 4,441,876 | A | 4/1984 | Marc | |
| 6,096,255 | A | * 8/2000 | Brown | A63B 37/0003 156/228 |
| 7,232,299 | B2 | 6/2007 | Marc | |
| 7,837,910 | B2 | 11/2010 | Marc | |

(Continued)

*Primary Examiner* — Joseph A Miller, Jr.

(74) *Attorney, Agent, or Firm* — Stinson Leonard Street LLP (57) ABSTRACT

The present invention is directed to a system and method for making hollow foam balls and other molded objects. A mold is provided that is moveable between an open position and a closed position. A raw material is loaded into a plurality of molding cavities of the mold when the mold is in its open position, and a first alternating electric field is applied across the mold to heat the raw material in the molding cavities and thereby form a plurality of molded pieces. The mold is then moved from its open position to its closed position whereby a first group of molded pieces is aligned with a second group of molded pieces. A second alternating electric field is applied across the mold to heat bond the first group of molded pieces with the second group of molded pieces and thereby form a plurality of molded objects. Finally, the mold is moved from its closed position to its open position to enable unloading of the molded objects from the mold.

29 Claims, 10 Drawing Sheets

(56) References Cited

U.S. PATENT DOCUMENTS

| | | |
|---|---|---|
| 8,236,212 B2 | 8/2012 | Marc |
| 8,298,470 B2 | 10/2012 | Marc |
| 8,357,726 B2 | 1/2013 | Marc |
| 8,470,897 B2 | 6/2013 | Marc |
| 8,602,927 B2 | 12/2013 | Marc |
| 8,715,437 B2 | 5/2014 | Marc |
| 8,815,964 B2 | 8/2014 | Marc |
| 8,961,889 B2 | 2/2015 | Marc |
| 9,162,114 B1 | 10/2015 | Marc |
| 2006/0078634 A1* | 4/2006 | Marc ............ B29C 33/0088 425/3 |
| 2008/0108717 A1* | 5/2008 | Tokoro ............ B29C 44/445 521/56 |
| 2009/0236030 A1 | 9/2009 | Marc |
| 2012/0290048 A1 | 11/2012 | Marc |
| 2012/0290049 A1 | 11/2012 | Marc |
| 2012/0290050 A1 | 11/2012 | Marc |
| 2012/0301689 A1 | 11/2012 | Marc |

* cited by examiner

SYSTEM AND METHOD FOR MAKING HOLLOW FOAM BALLS AND OTHER MOLDED OBJECTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Various types of toys are available in which a ball or other type of molded object can be shot from a toy gun or otherwise projected through the air. Typically, these balls are made of plastics or solid foam-based materials using an injection molding process. Some balls are soft and lightweight so as to be safe for use by children; however, these balls tend to have limited velocity and cannot be projected a great distance. Other balls are heavier so as to increase the distance over which they can be projected; however, these balls can cause injury to children or others when playing with the balls.

BRIEF SUMMARY OF THE INVENTION

The present invention is directed to a system and method for making hollow foam balls and other molded objects. In one aspect, a mold is provided that is moveable between an open position and a closed position. A raw material is loaded into a plurality of molding cavities of the mold when the mold is in its open position, and a first alternating electric field is applied across the mold to heat the raw material in the molding cavities and thereby form a plurality of molded pieces. The mold is then moved from its open position to its closed position whereby a first group of molded pieces is aligned with a second group of molded pieces. A second alternating electric field is applied across the mold to heat bond the first group of molded pieces with the second group of molded pieces and thereby form a plurality of molded objects. Finally, the mold is moved from its closed position to its open position to enable unloading of the molded objects from the mold.

In another aspect, a mold is provided that includes a lower mold and an upper mold. The lower mold includes a first mold section pivotally connected to a second mold section and is moveable between an open position and a closed position. The first and second mold sections of the lower mold each define a plurality of molding cavities. The upper mold includes a plurality of protrusions that extend into the molding cavities when the upper mold is placed on the lower mold.

A raw foam material is loaded into the molding cavities of the first and second mold sections when the lower mold is in the open position. The upper mold is placed on the lower mold, and the mold is placed between the electrodes of a dielectric heating apparatus. A first alternating electric field is applied between the electrodes and across the lower mold with the upper mold placed thereon to heat the raw foam material to its molding temperature in the molding cavities of the lower mold and thereby form a plurality of foam pieces. Preferably, the dielectric constant of the raw foam material is modified via the use of one or more additives so that its modified dielectric constant is substantially the same as the dielectric constant of a material used to form the mold. The protrusions of the upper mold create a hollow area in each of the foam pieces formed in the molding cavities of the lower mold. Preferably, the foam pieces are at least partially cooled after application of the first alternating electric field.

The mold is then removed from the dielectric heating apparatus and the upper mold is removed from the lower mold. The lower mold is moved from the open position to the closed position whereby the foam pieces in the molding cavities of the first mold section are aligned with the foam pieces in the molding cavities of the second mold section. The closed lower mold is then placed between the electrodes of a dielectric heating apparatus. A second alternating electric field is applied between the electrodes and across the lower mold to heat bond the foam pieces in the molding cavities of the first mold section with the foam pieces in the molding cavities of the second mold section and thereby form a plurality of hollow foam objects. Preferably, the hollow foam objects are cooled after application of the second alternating electric field. Finally, the lower mold is removed from the dielectric heating apparatus and the lower mold is moved from the closed position to the open position to enable unloading of the hollow foam objects from the lower mold.

The system and method of the present invention can be used to make a variety of different types of molded objects. In an exemplary embodiment, the present invention is used to form ball halves that are then heat bonded together to form hollow foam balls (e.g., up to 150 foam balls). These hollow foam balls are specifically designed to be shot from a toy gun or otherwise projected through the air and have superior properties to those of conventional toy balls, e.g., each ball can be projected a great distance and also provides shock absorption with minimal rebound so as not to cause injury to children or others who may be hit by the balls during play.

Also, the manufacturing of these hollow foam balls is less labor intensive than conventional processes. For example, when using the method of the claimed invention, the ball halves are not removed from the lower mold, i.e., the ball halves in the molding cavities of the first mold section are aligned properly with the ball halves in the molding cavities of the second mold section due to the structure of the moveable lower mold. This is an advantage over conventional processes in which the ball halves are removed from their respective molding cavities and must then be aligned in order to bond them together, which can be particularly difficult if the outer surface of the ball is textured.

In addition, these hollow foam balls can be manufactured in a relatively short period of time. In a first heating step, the time period required to heat the raw foam material to its molding temperature in the molding cavities of the lower mold to form the ball halves is in the range of about 20 second to about 50 seconds. Preferably, the ball halves are then partially cooled for a time period in the range of about 2 minutes to about 6 minutes. In a second heating step, the time period required to heat bond the ball halves together to form the hollow foam balls is in the range of about 10 seconds to about 30 seconds. Preferably, the hollow foam balls are then cooled for a time period in the range of about 6 minutes to about 10 minutes. Thus, a large number of hollow foam balls can be made in a relatively short period of time and the above steps can be performed in a production area that includes a plurality of different stations in order to further streamline the manufacturing process.

BRIEF DESCRIPTION OF THE DRAWINGS

Various exemplary embodiments of the present invention are described in detail below with reference to the attached drawing figures, wherein.

DETAILED DESCRIPTION OF EXEMPLARY EMBODIMENTS

The present invention is directed to a method of making hollow foam balls and other molded objects using dielectric heating. While the invention will be described in detail below with reference to various exemplary embodiments of the invention in which a two-piece mold is used to form a plurality of hollow foam balls, it should be understood that the invention is not limited to these embodiments and that other molds could be used to form other types of molded objects in accordance with the present invention. In addition, although the exemplary embodiments are described as embodying several different inventive features, one skilled in the art will appreciate that any one of these features could be implemented without the others in accordance with the invention.

Figure 1:
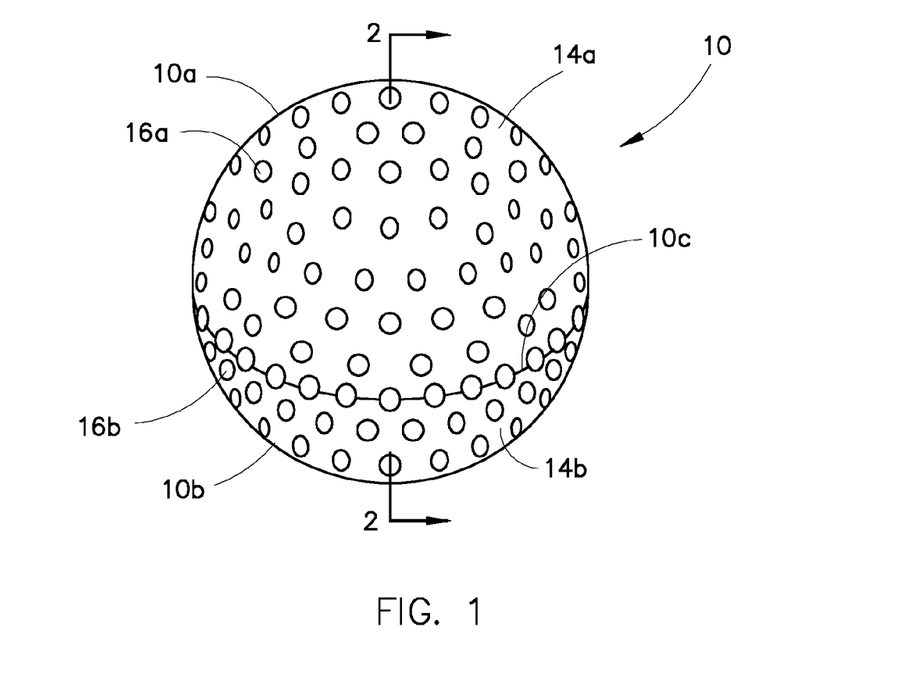
FIG. 1 is a front elevational view of a hollow foam ball made in accordance with the present invention.

Referring to FIG. 1, an exemplary embodiment of a hollow foam ball that may be formed in accordance with the present invention is shown generally as reference numeral 10. Ball 10 includes a first hemispherical ball half 10a and a second hemispherical ball half 10b that are heat bonded together along an interface zone 10c. As described below, first and second hemispherical ball halves 10a, 10b are each separately molded in a dielectric heating apparatus and subsequently bonded together to form ball 10. The first and second hemispherical ball halves 10a, 10b may be heat bonded together in the same dielectric heating apparatus used to form the ball halves. Alternatively, the first and second hemispherical ball halves 10a, 10b may be heat bonded together in a different apparatus (i.e., a different apparatus than that used to mold the ball halves), or, may be bonded together using glue or any other type of adhesive known to those skilled in the art.

Figure 2:
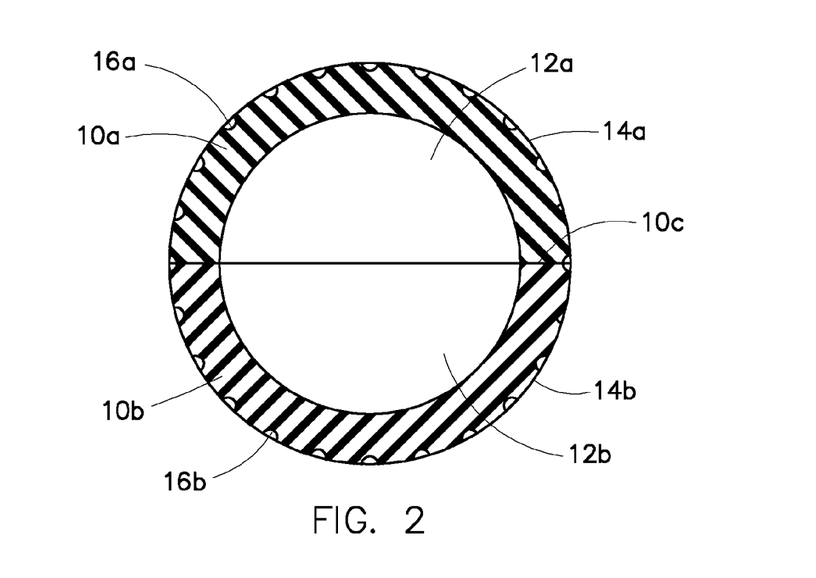
FIG. 2 is a cross-sectional view of the foam ball taken through the line 2-2 in FIG. 1.

As shown in FIG. 2, first hemispherical ball half 10a has an inner surface 12a and an outer surface 14a and, likewise, second hemispherical ball half 10b has an inner surface 12b and an outer surface 14b. Inner surfaces 12a, 12b are substantially smooth in texture. However, outer surfaces 14a, 14b have a plurality of dimples 16a, 16b, respectively, formed therein so as to create a dimpled texture on the outside surface of ball 10. It will be seen that the size, shape and pattern of dimples 16a, 16b are determined by the structure of the mold used to form first and second hemispherical ball halves 10a, 10b.

One skilled in the art will understand that various alternative ball configurations are possible and within the scope of the present invention. For example, the outer surfaces of the hemispherical ball halves may be smooth as opposed to dimpled. Also, the hemispherical ball halves may be molded so as to include various other types of surface features, e.g., nubs, ribs, channels, graphics, logos, and the like. While such surface features may be formed during the molding process, it will be appreciated that certain features (e.g., graphics and logos) may also be applied after molding, for example, by etching with a laser or embossing with a suitable mechanical device.

First and second hemispherical ball halves 10a, 10b may be formed from any raw foam material that is capable of being poured or otherwise loaded into a mold of a dielectric heating apparatus and heated and blown via the application of an alternating electric field (also referred to as a "dielectric field" and "dielectric heating"). In a preferred aspect, the raw foam material comprises a liquid or putty, albeit a liquid material is most preferred due to its ease of use. Raw foam materials that are suitable for use in accordance with the present invention include any thermoplastics or thermosets that have been mixed with one or more blowing agents and/or cross-linkers such as, for example, plastisol foams and other PVC-based liquid foams. Of course, other compounds could also be used in accordance with the present invention. Preferably, the selected raw foam material when heated and blown provides a finished ball 10 that is generally durable and wear-resistant and enables the ball to be projected a great distance without causing injury to children or others who may be hit by the ball during play.

In order to decrease the likelihood of an injury, the dimensional characteristics of ball 10 should preferably be selected to provide shock absorption with minimal rebound. In the exemplary embodiment, the thickness of ball 10 is in the range of about 0.2 cm to about 0.8 cm (e.g., about 0.2, 0.3, 0.4, 0.5, 0.6, 0.7, or 0.8 cm) and is most preferably in the range of about 0.38 cm to about 0.42 cm (e.g., about 0.38, 0.39, 0.40, 0.41, or 0.42 cm). Also, the rebound of ball 10 as measured using ASTM D7121-05 is preferably in the range of about 1% to about 15% (e.g., about 1%, 2%, 3%, 4%, 5%, 6%, 7%, 8%, 9%, 10%, 11%, 12%, 13%, 14%, or 15%) and is most preferably in the range of about 1% to about 5% (e.g., about 1%, 2%, 3%, 4%, or 5%). In addition, the weight of ball 10 is preferably in the range of about 1 g to about 5 g (e.g., about 1, 1.5, 2.0, 2.5, 3.0, 3.5, 4.0, 4.5, or 5.0 g) and is most preferably in the range of about 1.7 g to about 2.7 g (e.g., about 1.7, 1.8, 1.9, 2.0, 2.1, 2.2, 2.3, 2.4, 2.5, 2.6, or 2.7 g).

Figure 3:
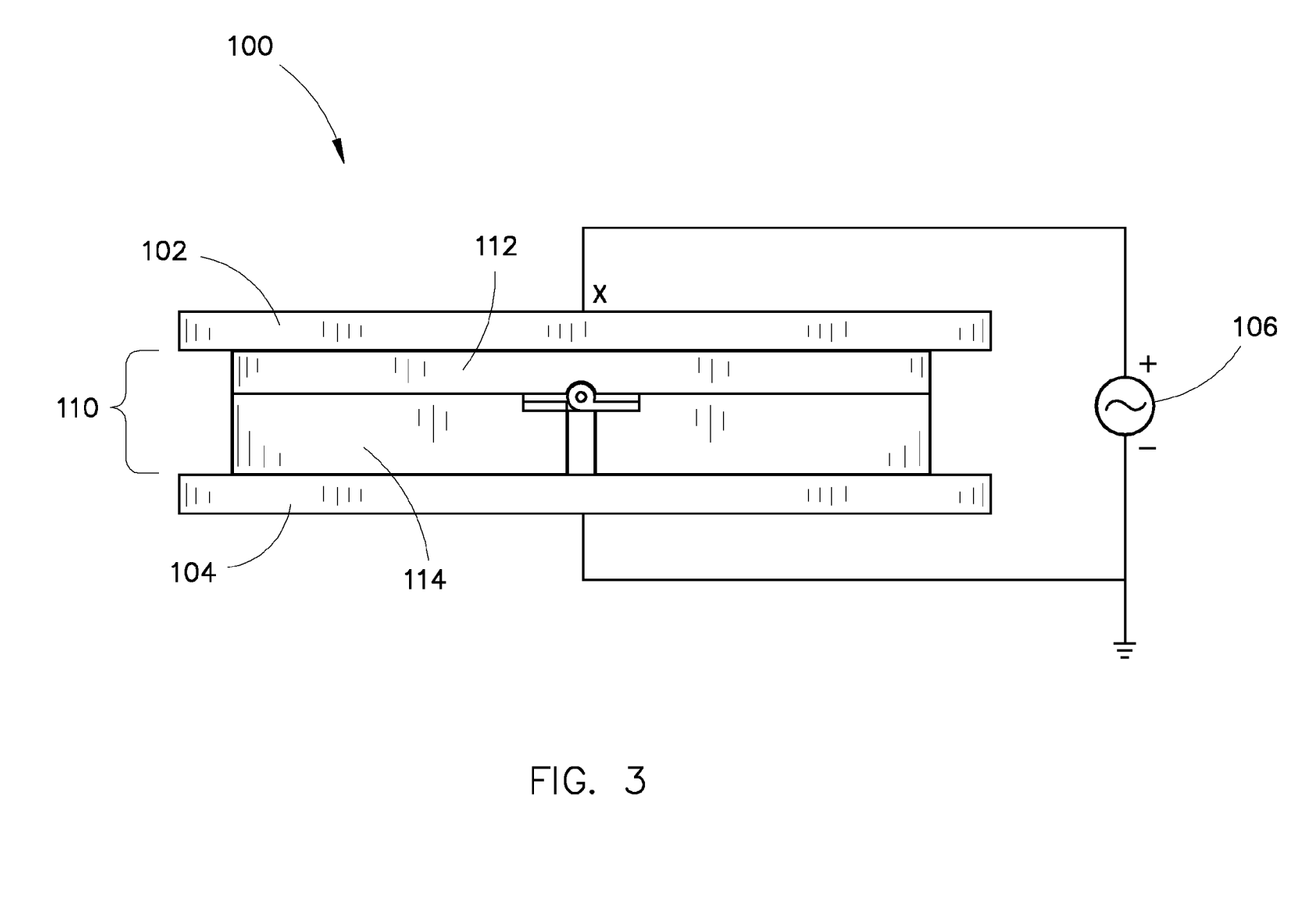
FIG. 3 is a diagram of an exemplary dielectric heating apparatus for forming a plurality of hollow foam balls (such as the ball shown in FIG. 1) in accordance with the present invention, which includes a mold comprising an upper mold and a lower mold disposed between top and bottom electrodes.

Referring to FIG. 3, an exemplary embodiment of a dielectric heating apparatus that may be used to make a plurality of hollow foam balls in accordance with the present invention is shown generally as reference numeral 100. Dielectric heating apparatus 100 generally includes a top electrode 102 and a bottom electrode 104 with a mold 110 disposed therebetween. In the illustrated embodiment, top and bottom electrodes 102, 104 each comprise a plate formed of any conductive material that is sized to extend across mold 110. Mold 110 is comprised of an upper mold 112 and a lower mold 114, which will be described in greater detail below.

Top electrode 102 and bottom electrode 104 are connected to a generator or other energy source 106 operable to generate an alternating electric field between the electrodes and across mold 110. In this embodiment, top electrode 102 is the high voltage electrode while bottom electrode 104 is the ground electrode (although this could be reversed such that the top electrode is the ground electrode and the bottom electrode is the high voltage electrode). The voltage is substantially constant across the surface area of the electrodes (as discussed below) and is typically in the range of ±3,000 volts to ±10,000 volts. The alternating electric field may be generated at frequencies ranging from 1 MHz to 500 MHz, is preferably generated at frequencies ranging from 10 MHz to 200 MHz, and is most preferably generated at either 27.12 MHz or 40.68 MHz (both of which are allowed center frequencies for industrial, scientific, and medical (ISM) applications). It should be understood that the size of the electrodes will vary depending on the surface area of mold 110.

Generator 106 contains a power tube and LC circuit, or may alternatively contain solid-state technology. Preferably, generator 106 is tuned to resonate at the selected frequency, which occurs when the inductive reactance balances the capacitive reactance at the selected frequency, as follows:

$$f = \frac{1}{2\pi\sqrt{LC}}$$

where
f=frequency of dielectric field in hertz;
L=inductance in henries; and
C=capacitance in farads.

The signal generated by generator 106 is substantially a sinusoid having a wavelength λ. Preferably, mold 110 is placed between top electrode 102 and bottom electrode 104 and generally centered at a position that is ¼λ or, alternatively, ¼λ plus a multiple of ½λ (e.g., ¾λ, 1¼λ, etc.), from the power tube of generator 106. The peak of the sinusoid is located at these positions, which provides the most constant voltage (i.e., the lowest voltage change) on the sinusoid.

The wavelength of the sinusoid is expressed as follows:

$$\lambda = \frac{c}{f}$$

where
λ=wavelength of sinusoid in meters;
c=speed of light ($3\times10^8$ m/sec); and
f=frequency of alternating electric field in hertz.

Using this equation, the wavelength of a sinusoid for an alternating electric field generated at 27.12 MHz is as follows:

$$\lambda = \frac{3\times10^8}{27.12\times10^6} = 11.1 \text{ meters} = 36.3 \text{ feet}$$

Thus, the ¼λ position is located 9.1 feet from the power tube of generator 106.

Similarly, the wavelength of a sinusoid for an alternating electric field generated at 40.68 MHz is as follows:

$$\lambda = \frac{3\times10^8}{40.68\times10^6} = 7.5 \text{ meters} = 24.6 \text{ feet}$$

Thus, the ¼λ position is located 6.15 feet from the power tube of generator 106.

One skilled in the art will understand that the use of a lower frequency (e.g., 27.12 MHz) will provide a more consistent voltage across top electrode 102 due to the longer wavelength λ of the generated signal. However, the use of a higher frequency (e.g., 40.68 MHz) will heat mold 110 at a faster rate. Thus, for any given application, the desired frequency may be selected with these considerations in mind. Of course, the surface area of mold 110 may dictate the desired frequency.

As discussed above, apparatus 100 shown in FIG. 3 may be used to apply a substantially constant voltage across top electrode 102 if mold 110 is placed at or near the ¼λ position (or, alternatively, ¼λ plus a multiple of ½λ). With this electrode configuration, a single point (designated as point X in FIG. 3) is located at the ¼ wavelength position (or, alternatively, ¼λ plus a multiple of ½λ), which corresponds to the highest voltage on the sinusoid. In order to apply an even more consistent voltage across the top electrode, top electrode 102 (which comprises a single plate) may be replaced with a top electrode comprising a plurality of electrically connected plates arranged in a tiered configuration such that a plurality of points are located at the ¼ wavelength position (or, alternatively, ¼λ plus a multiple of ½λ). An example of this configuration is discussed in Marc U.S. Pat. No. 8,470,897, which is incorporated herein by reference.

In a preferred aspect, a substantially constant voltage is applied across the high voltage electrode (such as top electrode 102 shown in FIG. 3) such that the difference between the voltage provided at a point on the high voltage electrode compared to the voltage provided at each other point on the high voltage electrode is preferably less than ±10%, more preferably less than ±8%, more preferably less than ±6%, more preferably less than ±4%, and most preferably less than ±2%.

Figure 4:
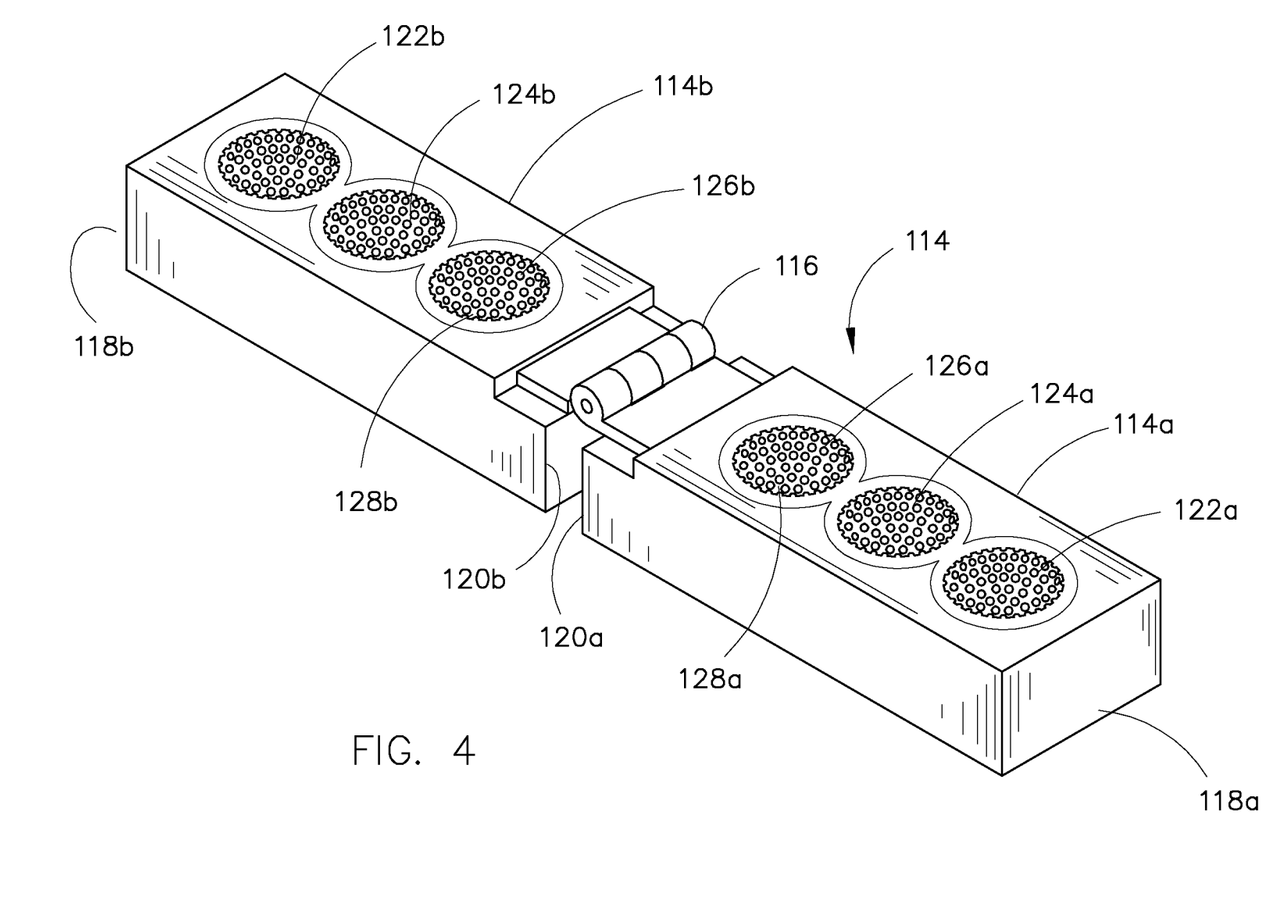
FIG. 4 is a perspective view of the lower mold shown in FIG. 3, wherein the lower mold is in its open position.

Referring now to FIG. 4, lower mold 114 is formed of a relatively rigid material that is not electrically conductive and preferably has a low dissipation factor, such as, for example, Garolite G-7. Lower mold 114 includes a first mold section 114a and a second mold section 114b that are secured together via a hinged connection 116 as shown. Of course, other means of securing first mold section 114a to second mold section 114b may be used in accordance with the present invention. Lower mold 114 is moveable between an open position (shown in FIG. 4) and a closed position (shown in FIG. 10) by pivoting first mold section 114a with respect to second mold section 114b via hinged connection 116, as described below.

Figure 7:
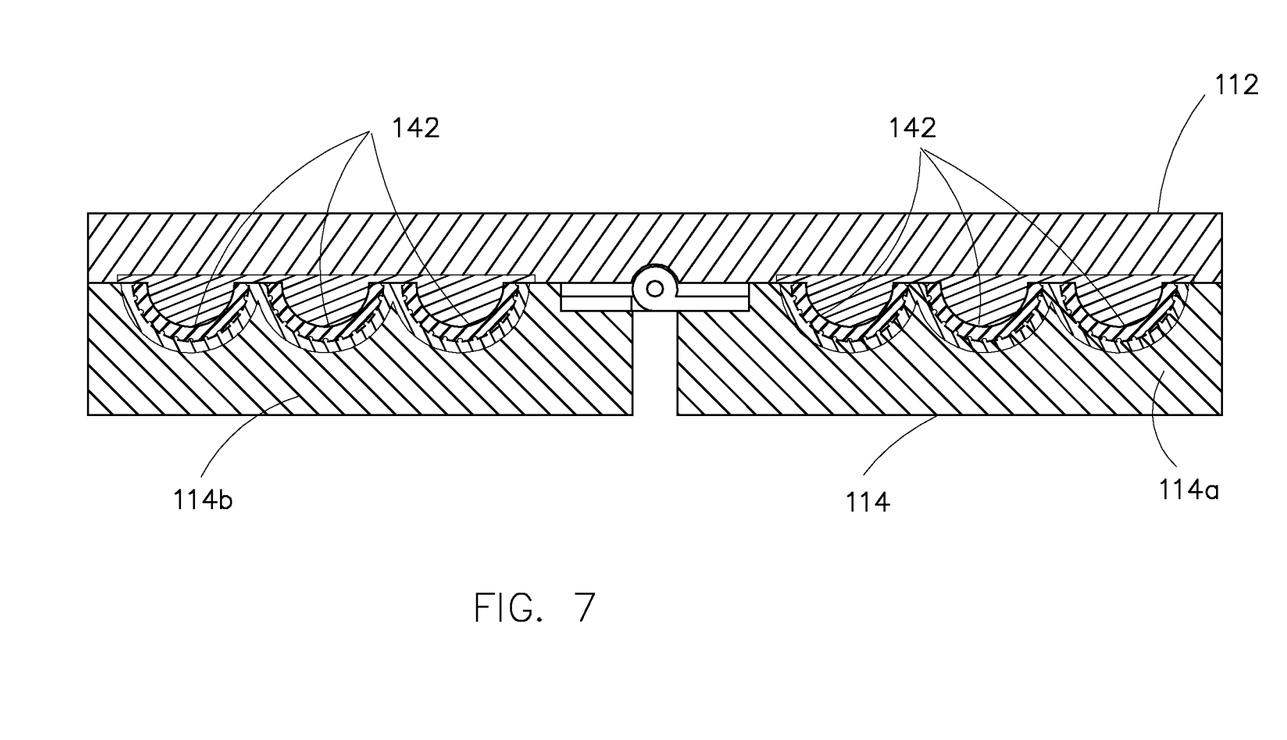
FIG. 7 is a cross-sectional view of the mold shown in FIG. 3.

First mold section 114a extends between an outer end 118a and an inner end 120a (located adjacent hinged connection 116) and includes a plurality of molding cavities 122a, 124a and 126a each of which has a layer of silicone rubber formed therein. Likewise, second mold section 114b extends between an outer end 118b and an inner end 120b (located adjacent hinged connection 116) and includes a plurality of molding cavities 122b, 124b and 126b each of which has a layer of silicone rubber formed therein. The layers of silicone rubber within the molding cavities are best shown in FIG. 7. One skilled in the art will appreciate that the silicone rubber (or any other suitable material) enables the finished balls to be easily removed from lower mold 114 at the end of the molding process.

As described below, when lower mold 114 is in its open position, the raw foam material used to form the hollow foam balls (such as ball 10 shown in FIG. 1) is poured or otherwise loaded into each of the molding cavities in order to mold a plurality of hemispherical ball halves (such as first and second hemispherical ball halves 10a, 10b shown in FIG. 1). As also described below, when lower mold 114 is moved to its closed position, the hemispherical ball halves molded in molding cavities 122a, 124a and 126a are aligned with the hemispherical ball halves molded in molding cavities 122b, 124b and 126b, respectively, and are heat bonded together to form three hollow foam balls. Of course, one skilled in the art will appreciate that first and second mold sections 114a, 114b may include any number of molding cavities in any configuration (e.g., a linear or matrix configuration) that enable the formation of any number of hollow foam balls (e.g., up to 150 foam balls) in accordance with the present invention.

Referring still to FIG. 4, the layer of silicone rubber in each of molding cavities 122a, 124a and 126a has a plurality of nubs 128a that cause the formation of a plurality of dimples on the outer surfaces of the hemispherical ball halves molded in first mold section 114a. Likewise, the layer of silicone rubber in each of molding cavities 122b, 124b and 126b has a plurality of nubs 128b that cause the formation of a plurality of dimples on the outer surfaces of the hemispherical ball halves molded in second mold section 114b. As noted above, the size, shape and pattern of nubs 128a, 128b will determine the size, shape and pattern of the dimples formed on the outer surfaces of the hemispherical ball halves molded in first and second mold sections 114a, 114b (such as dimples 16a, 16b shown in FIG. 1). Of course, in alternative embodiments, the layer of silicone rubber in the molding cavities may be smooth or may include various other types of surface features within the scope of the present invention.

Figure 5:
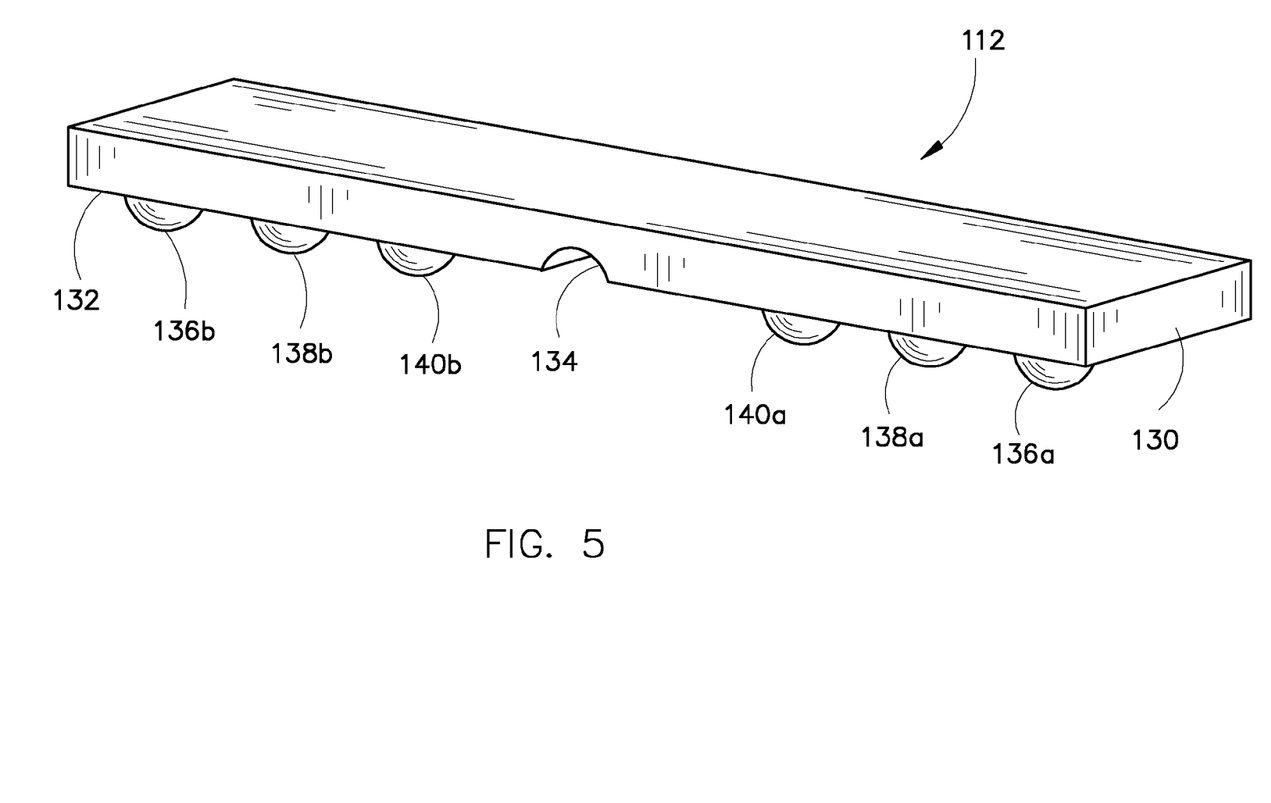
FIG. 5 is a perspective view of the upper mold shown in FIG. 3.
Figure 6:
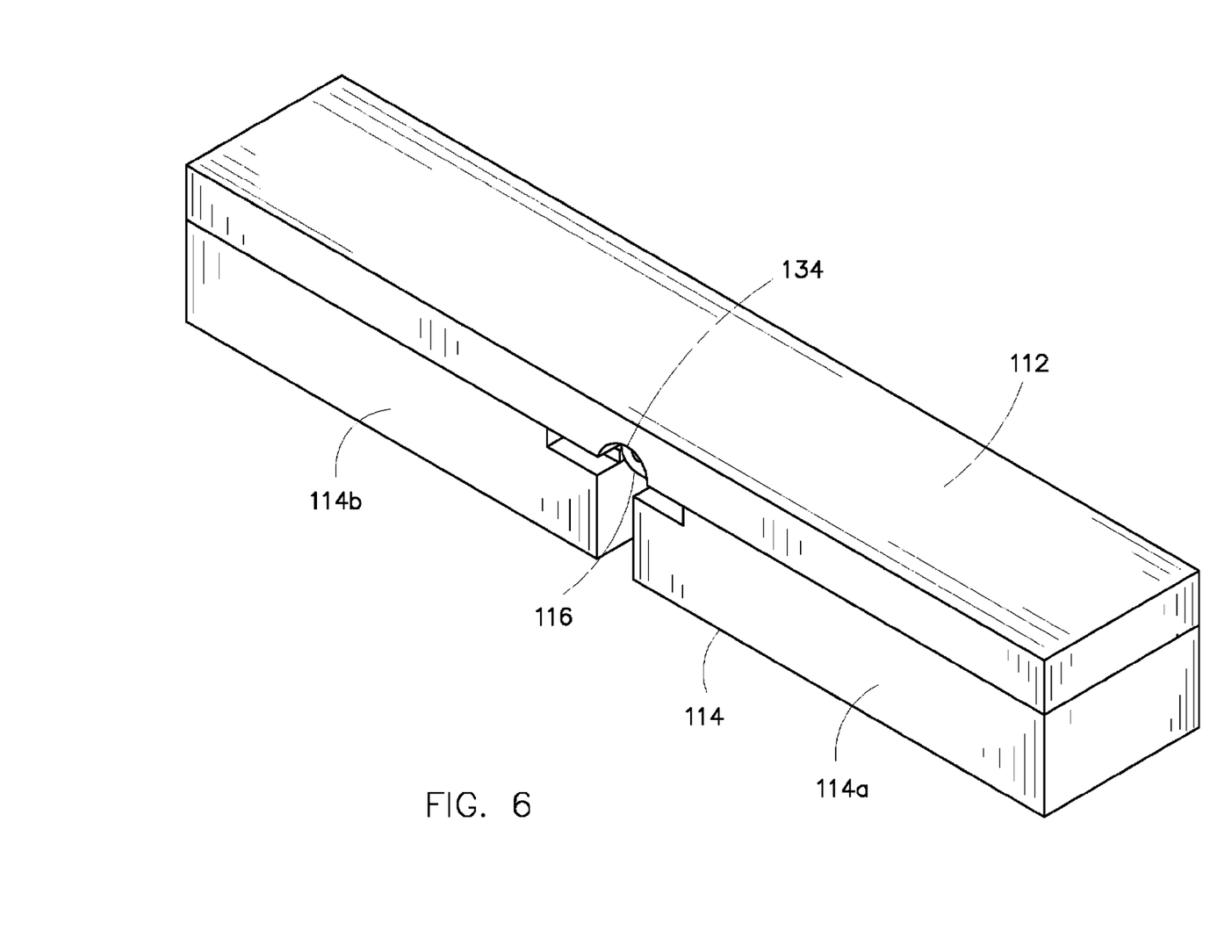
FIG. 6 is a perspective view of the mold shown in FIG. 3, wherein the raw foam material has been loaded into the lower mold and the upper mold has been lowered onto the lower mold.

Referring to FIG. 5, upper mold 112 is also formed of a relatively rigid material that is not electrically conductive and preferably has a low dissipation factor, such as, for example, Garolite G-7. Upper mold 112 extends between a first end 130 and a second end 132 and includes a central cutout section 134 positioned about halfway therebetween. Cutout section 134 comprises a channel that extends the width of upper mold 112 and is positioned to cover hinged connection 116 when upper mold 112 is lowered onto lower mold 114 (as shown in FIG. 6). Preferably, upper and lower molds 112, 114 include an alignment mechanism (not shown) that permits alignment of upper mold 112 onto lower mold 114. The alignment mechanism may comprise, for example, pins that extend from upper mold 112 that are inserted into corresponding holes formed in lower mold 114. Of course, other types of alignment mechanisms may also be used in accordance with the present invention.

As best shown in FIG. 7, upper mold 112 includes two sections of silicone rubber that extend along portions of its bottom face—a first section is aligned with the molding cavities of first mold section 114a and a second section is aligned with the molding cavities of second mold section 114b. Looking back to FIG. 5, the first section of silicone rubber includes a plurality of hemispherical protrusions 136a, 138a, 140a adapted to be lowered into molding cavities 122a, 124a and 126a, respectively, of first mold section 114a. Likewise, the second section of silicone rubber includes a plurality of hemispherical protrusions 136b, 138b, 140b adapted to be lowered into molding cavities 122b, 124b and 126b, respectively, of second mold section 114b. It should be understood that the hemispherical protrusions serve to form the hollow area of the hemispherical ball halves formed in the molding cavities. One skilled in the art will appreciate that the hemispherical protrusions and corresponding molding cavities together define the size, shape, surface texture and thickness of the hollow foam balls to made in dielectric heating apparatus 100. Thus, upper and lower molds 112, 114 may be configured to form hollow foam balls having a variety of different sizes, shapes, surface textures and thicknesses.

Preferably, the raw foam material (e.g., the plastisol foam) is modified via the use of one or more suitable additives so that the dielectric constant of the raw foam material is substantially the same as the dielectric constant of the material used to form the rigid frame of upper and lower molds 112, 114 (e.g., Garolite G-7). Similarly, the silicone rubber portions of upper and lower molds 112, 114 are modified via the use of one or more suitable additives so that the dielectric constant of the silicone rubber is substantially the same as the dielectric constant of the material used to form the rigid frame of upper and lower molds 112, 114 (e.g., Garolite G-7). These modifications will provide a substantially constant current through the raw foam material (as discussed below). In this embodiment, the dielectric constant of Garolite G-7 is about 5 such that the dielectric constant of the plastisol foam is modified to be about 5 and the dielectric constant of the silicone rubber is modified to be about 5.

In an alternative embodiment, the upper and lower molds are entirely formed of a conductive material with the exception of a thin layer of silicone rubber on the portions of the molds in contact with the raw foam material. As such, the upper and lower molds function as part of the electrodes of the dielectric heating apparatus. In this case, the raw foam material (e.g., the plastisol foam) is modified via the use of one or more suitable additives so that the dielectric constant of the raw foam material is substantially the same as the dielectric constant of the silicone rubber portions of the upper and lower molds (or vice-versa). It should be understood that the heating times of this alternative embodiment will be shorter than the heating times of the exemplary embodiment due to the fact that the electrodes are located closer to the raw foam material. Of course, the heating times of the exemplary embodiment are relatively short (as described below) such that the even shorter heating times of the alternative embodiment are not required.

With reference to FIGS. 4 and 6-11, a two-step method of making a plurality of hollow foam balls using dielectric heating apparatus 100 will now be described.

Step 1: Mold Hemispherical Ball Halves

First, lower mold 114 is moved to the open position shown in FIG. 4 to permit the loading of a raw foam material into molding cavities 122*a*, 124*a* and 126*a* of first mold section 114*a* and into molding cavities 122*b*, 124*b* and 126*b* of second mold section 114*b*. In this embodiment, the raw foam material is a liquid plastisol foam that is poured into the molding cavities. As shown in FIG. 6, upper mold 112 is then lowered onto lower mold 114, preferably via the use of an alignment mechanism, and locked using any suitable locking mechanism known in the art. Because the raw foam material (shown as reference numeral 142 in FIG. 7) contains a blowing agent and thus will expand when heated, the amount of raw foam material loaded into the molding cavities will preferably be an amount that does not completely fill the volume between molding cavities 122*a*, 124*a* and 126*a* and hemispherical protrusions 136*a*, 138*a*, 140*a*, respectively, and between molding cavities 122*b*, 124*b* and 126*b* and hemispherical protrusions 136*b*, 138*b*, 140*b*, respectively, so as to allow for expansion of the raw foam material during the heating cycle.

After upper mold 112 has been lowered onto lower mold 114 and locked, mold 110 is placed into dielectric heating apparatus 100 between top electrode 102 and bottom electrode 104 (as shown in FIG. 3). Generator 106 is then activated so as to establish an alternating electric field between top and bottom electrodes 102, 104 and across mold 110. Generator 106 remains activated for a predetermined heating time, which is typically on the order of about 20 seconds to about 50 second (e.g., about 20, 25, 30, 35, 40, 45 or 50 seconds), to thereby heat the raw foam material to its molding temperature (i.e., the temperature at which the raw foam material will be fully blown). In this embodiment, the heating time is about 40 seconds at which time the liquid plastisol foam reaches its molding temperature of about 320° F. Because the dielectric constant of the mold 110 (which comprises both Garolite G-7 and silicone rubber) is substantially the same as the dielectric constant of the raw foam material (as discussed above), the current passing through the raw foam material is substantially uniform so as to heat the raw foam material in a substantially uniform manner as generally discussed in Marc U.S. Pat. No. 4,441,876, which is incorporated herein by reference. In a preferred aspect, a substantially constant current passes through the raw foam material such that the difference between the current passing through a portion of the raw foam material compared to the current passing through each other portion of the raw foam material is preferably less than ±25%, more preferably less than ±20%, more preferably less than ±15%, more preferably less than ±10%, and most preferably less than ±5%. Mold 110 is also pressurized to cause expansion of the foam material within mold 110, as is known in the art. As such, the foam material will be blown during the heating cycle to form six hemispherical ball halves.

At the end of the heating cycle, dielectric heating apparatus 100 is partially cooled for a predetermined cooling time, which is typically on the order of about 2 minutes to about 6 minutes (e.g., about 2, 3, 4, 5, or 6 minutes), by any suitable cooling technique. For example, a coolant such as chilled water may be passed through a plurality of passages (not shown) formed in top and bottom electrodes 102, 104. In this embodiment, the cooling time is about 4 minutes at which time the temperature of the blown foam material is lowered to a temperature in the range of about 150° F. to about 180° F. At this point, the hemispherical ball halves are still fairly hot yet able to retain their shape. Because the hemispherical ball halves are not completely cooled, the time required to heat bond the ball halves together in the second heating step of the process (discussed below) is decreased. Thus, the heating time required for the second heating step of the process is dependent on the temperature of the hemispherical ball halves at the end of this cooling stage.

Figure 8:
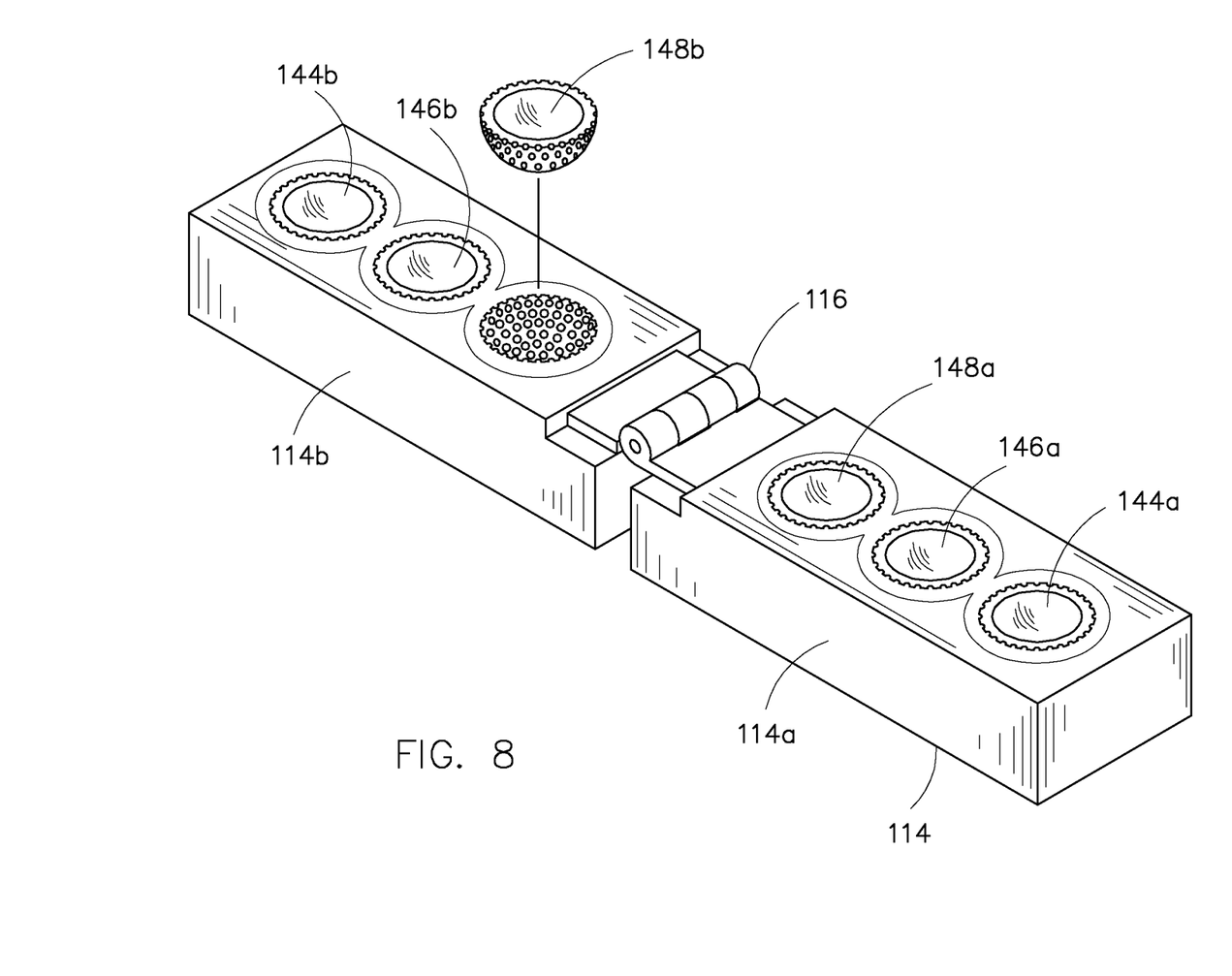
FIG. 8 is a perspective view of the lower mold shown in FIG. 3, wherein the lower mold is in its open position and six hemispherical ball halves have been molded in the molding cavities (wherein one ball half has been removed from its molding cavity to show the configuration of the ball half)

Next, mold 100 is removed from dielectric heating apparatus 100 and upper mold 112 is removed from lower mold 114. As shown in FIG. 8, three hemispherical ball halves 144*a*, 146*a* and 148*a* are molded in molding cavities 122*a*, 124*a* and 126*a*, respectively, of first mold section 114*a* and three hemispherical ball halves 144*b*, 146*b* and 148*b* are molded in molding cavities 122*b*, 124*b* and 126*b*, respectively, of second mold section 114*b*. Hemispherical ball half 148*b* is shown in FIG. 8 as being removed from molding cavity 126*b* of second mold section 114 for purposes of illustrating the configuration of each of the hemispherical ball halves. It should be understood that the hemispherical ball halves will not be removed from their respective molding cavities at this stage of the molding process.

Step 2: Heat Bond Hemispherical Ball Halves Together

Figure 9:
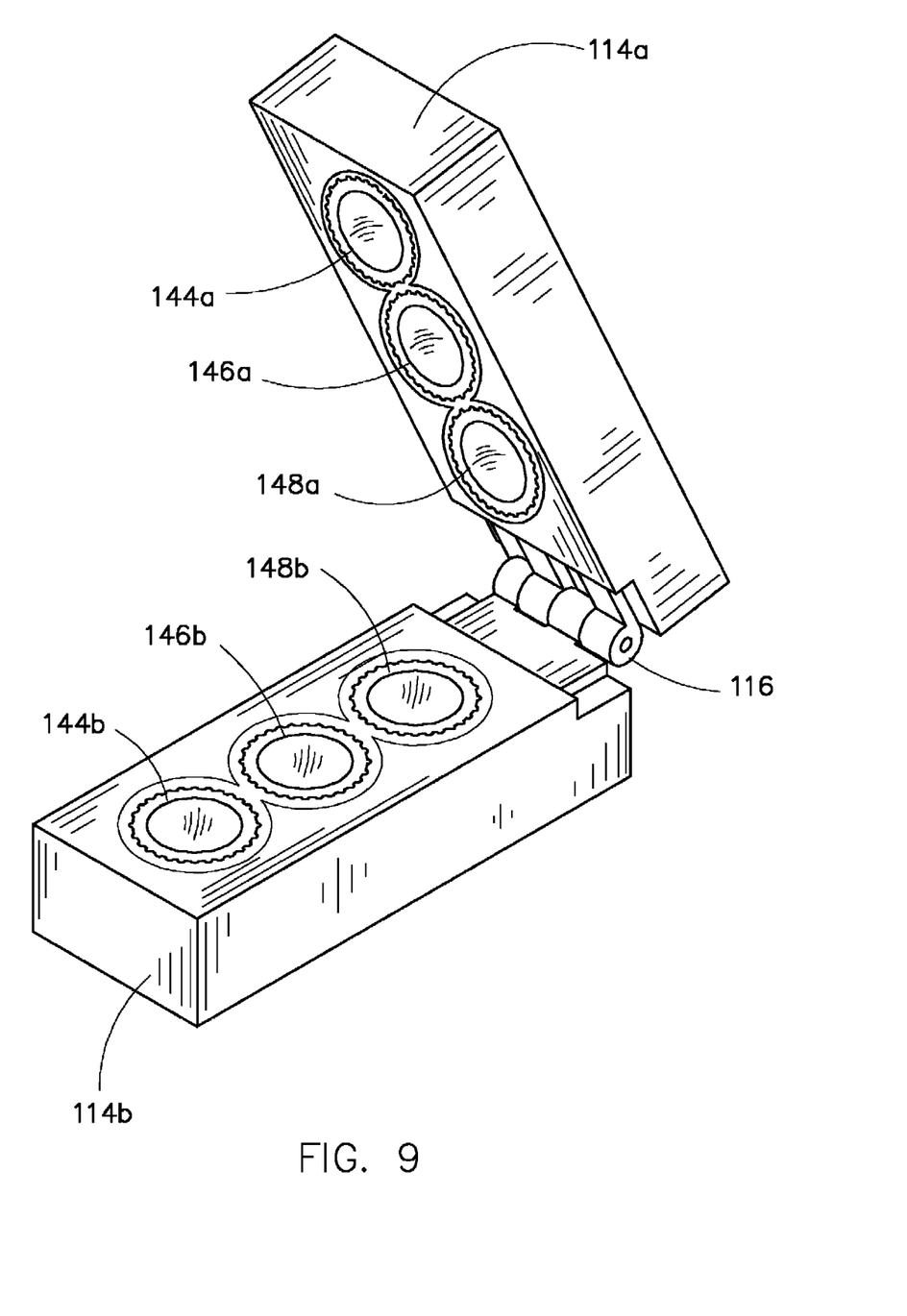
FIG. 9 is a perspective view of the lower mold shown in FIG. 3, wherein the lower mold is being folded from its open position to its closed position with the six hemispherical ball halves molded in the molding cavities.
Figure 10:
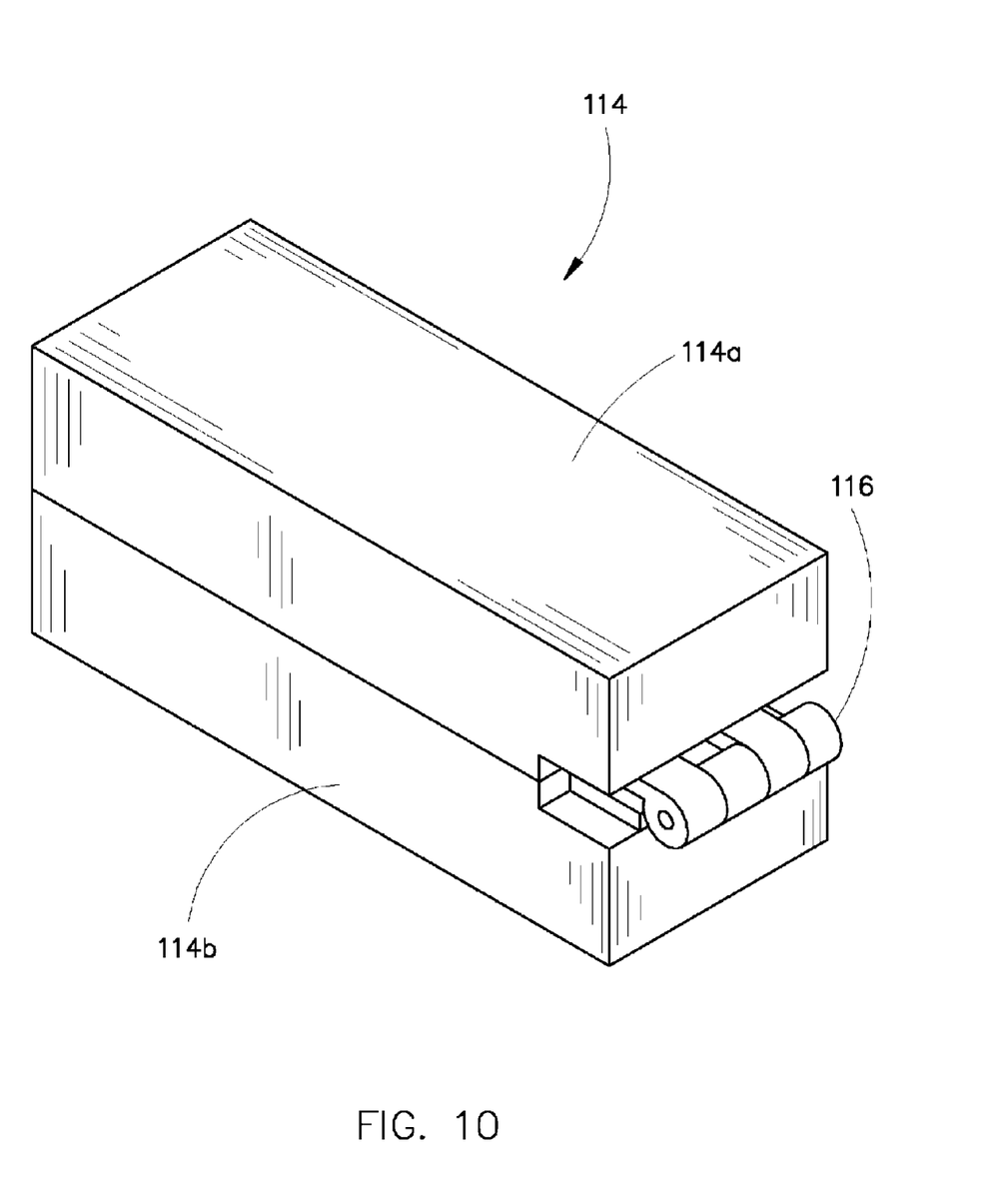
FIG. 10 is a perspective view of the lower mold shown in FIG. 3, wherein the lower mold is in its closed position.

As shown in FIG. 9, lower mold 114 is moved from the open position shown in FIG. 8 to the closed position shown in FIG. 10 by pivoting first mold section 114*a* onto second mold section 114*b* via hinged connection 116. This causes the three hemispherical ball halves 144*a*, 146*a* and 148*a* molded in molding cavities 122*a*, 124*a* and 126*a* of first mold section 114*a* to be aligned with the three hemispherical ball halves 144*b*, 146*b* and 148*b* molded in molding cavities 122*b*, 124*b* and 126*b* of second mold section 114*b*. Specifically, ball half 144*a* will be aligned with ball half 144*b*, ball half 146*a* will be aligned with ball half 146*b*, and ball half 148*a* will be aligned with ball half 148*b*. Importantly, the hemispherical ball halves are not removed from the mold and are aligned properly due to the structure of the mold. This is an advantage over conventional bonding processes in which the ball halves are removed from their respective molding cavities and must then be aligned in order to bond them together.

When lower mold 114 has been moved to its closed position, as shown in FIG. 10, lower mold 114 is placed into dielectric heating apparatus 100 between top electrode 102 and bottom electrode 104. Generator 106 is then activated so as to establish an alternating electric field between top and bottom electrodes 102, 104 and across mold 110. Generator 106 remains activated for a predetermined heating time, which is typically on the order of about 10 seconds to about 30 seconds (e.g., about 10, 15, 20, 25, or 30 seconds), to thereby heat bond hemispherical ball halves 144*a*, 146*a* and 148*a* to hemispherical ball halves 144*b*, 146*b* and 148*b*, respectively. In this embodiment, the heating time is about 20 seconds.

Preferably, the hemispherical ball halves, such as ball half 144*a* and ball half 144*b*, are heat bonded together only along the interface zone (such as interface zone 10*c* shown in FIG. 1). It will be appreciated that the dielectric constant of the hemispherical ball halves is greater than that of the air inside the ball. For example, in this embodiment, the dielectric constant of the hemispherical ball halves is about 5 and the dielectric constant of the air inside the ball is about 1. As a result, the current is concentrated at the interface zone of the hemispherical ball halves to thereby create a welded/cured joint along the interface zone. Thus, as used herein, the term "heat bonding," or variants thereof, refers to a securing technique that involves a melting or softening of the ball material of hemispherical ball halves along the interface zone so that the hemispherical ball halves are welded/cured to each other when cooled. It should be noted that if the hemispherical ball halves were instead heated in an oven to bond them together, the ball would collapse on itself because the entire surface of the ball would be heated and begin to melt. Thus, by using dielectric heating, the air between the hemispherical ball halves is used to prevent heating of the ball other than along the interface zone.

At the end of the heating cycle, dielectric heating apparatus 100 is cooled for a predetermined cooling time, which is typically on the order of about 6 minutes to about 10 minutes (e.g., about 6, 7, 8, 9, or 10 minutes), by any suitable cooling technique. For example, a coolant such as chilled water may be passed through a plurality of passages (not shown) formed in top and bottom electrodes 102, 104. In this embodiment, the cooling time is about 8 minutes at which time the temperature of the hemispherical ball halves is lowered to a temperature less than about 150° F.

Figure 11:
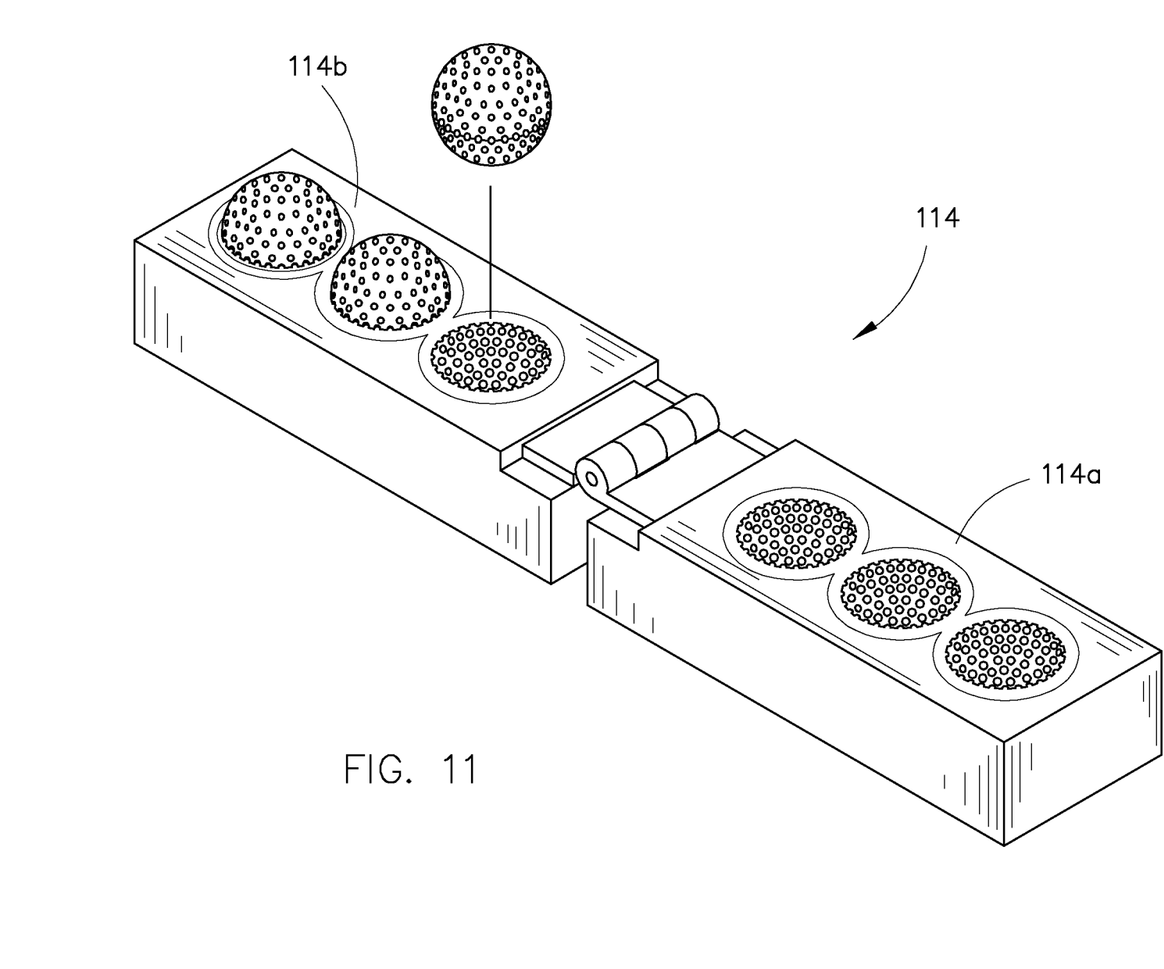
FIG. 11 is a perspective view of the lower mold shown in FIG. 3, wherein the lower mold is in its open position and three hollow foam balls have been formed in the molding cavities (wherein one ball has been removed from its molding cavity to show the configuration of the ball).

After heat bonding the hemispherical ball halves together, lower mold 114 is removed from dielectric heating apparatus 100. Lower mold 114 is then moved from the closed position shown in FIG. 10 to the open position shown in FIG. 11 by pivoting first mold section 114a away from second mold section 114b via hinged connection 116. It will be appreciated that the three finished balls located in molding cavities 122b, 124b and 126b of second mold section 114b as shown in FIG. 11 each have the same configuration as ball 10 shown in FIG. 1. The finished balls are then unloaded from molding cavities 122b, 124b and 126b of second mold section 114b. Of course, it should be understood that the finished balls may alternatively be located in and unloaded from molding cavities 122a, 124a and 126a of first mold section 114a if second mold section 114b had been pivoted away from first mold section 114a when moving lower mold 114 from its closed position to its open position. Thus, the present invention enables the manufacture of finished balls with less labor than that required of conventional bonding processes and enables the formation of higher quality balls.

The steps described above may be performed in a production area that includes a plurality of different stations arranged in a rotary or circular configuration, an elongated conveyor configuration, or any other suitable configuration known in the art. For example, the production area may include a loading/unloading station (for loading the raw foam material into the molding cavities of the lower mold and unloading the finished balls from the molding cavities of the lower mold), a heating station (for placing the mold in the dielectric heating apparatus and activating the generator to thereby heat the raw material to its molding temperature), a heat bonding station (for placing the closed lower mold in the dielectric heating apparatus and activating the generator to thereby heat bond the hemispherical ball halves together), and one or more cooling stations (for passing a coolant through the passages in the electrodes). Of course, the number and types of stations may vary between different applications.

While the present invention has been described and illustrated hereinabove with reference to several exemplary embodiments, it should be understood that various modifications could be made to these embodiments without departing from the scope of the invention. Therefore, the present invention is not to be limited to the specific materials, configurations or methods of the exemplary embodiments, except insofar as such limitations are included in the following claims.

What is claimed and desired to be secured by Letters Patent is as follows:

1. A method for molding a plurality of hollow foam balls, comprising:
    providing a mold comprising a lower mold and an upper mold formed of a mold material, wherein the lower mold includes a first mold section pivotally connected to a second mold section and is moveable between an open position and a closed position, wherein the first and second mold sections of the lower mold each define a plurality of molding cavities, and wherein the upper mold includes a plurality of hemispherical protrusions that extend into the molding cavities when the upper mold is placed on the lower mold;
    loading a raw foam material into the molding cavities of the first and second mold sections when the lower mold is in the open position, wherein a dielectric constant of the raw foam material is modified via the use of one or more additives so that a modified dielectric constant of the raw foam material is substantially the same as a dielectric constant of the mold material;
    placing the upper mold on the lower mold;
    applying a first alternating electric field across the lower mold with the upper mold placed thereon to heat the raw foam material in the molding cavities of the lower mold and thereby form a plurality of hemispherical ball halves, wherein the hemispherical protrusions of the upper mold create a hollow area in each of the hemispherical ball halves formed in the molding cavities of the lower mold;
    removing the upper mold from the lower mold;
    moving the lower mold from the open position to the closed position whereby the hemispherical ball halves in the molding cavities of the first mold section are aligned with the hemispherical ball halves in the molding cavities of the second mold section;
    applying a second alternating electric field across the lower mold to heat bond the hemispherical ball halves in the molding cavities of the first mold section with the hemispherical ball halves in the molding cavities of the second mold section and thereby form a plurality of hollow foam balls; and
    moving the lower mold from the closed position to the open position to enable unloading of the hollow foam balls from the lower mold.

2. The method of claim 1, wherein the first mold section is pivotally connected to the second mold section via a hinged connection.

3. The method of claim 1, wherein the raw foam material comprises a plastisol foam.

4. The method of claim 1, wherein the first alternating electric field heats the raw foam material to its molding temperature in the molding cavities of the lower mold.

5. The method of claim 1, wherein the first alternating electric field is applied for a time period in a range of about 20 second to about 50 seconds.

6. The method of claim 1, further comprising cooling the hemispherical ball halves after application of the first alternating electric field.

7. The method of claim 6, wherein the hemispherical ball halves are cooled for a time period in a range of about 2 minutes to about 6 minutes.

8. The method of claim 1, wherein the second alternating electric field is applied for a time period in a range of about 10 seconds to about 30 seconds.

9. The method of claim 1, further comprising cooling the hollow foam balls after application of the second alternating electric field.

10. The method of claim 9, wherein the hollow foam balls are cooled for a time period in a range of about 6 minutes to about 10 minutes.

11. The method of claim 1, wherein the hemispherical ball halves are not removed from the lower mold until after the lower mold is moved from the closed position to the open position to enable unloading of the hollow foam balls from the lower mold.

12. The method of claim 1, wherein the first alternating electric field is applied in a first dielectric heating apparatus and the second alternating electric field is applied in a second dielectric heating apparatus.

13. The method of claim 1, wherein the first and second electric fields are separately applied in the same dielectric heating apparatus.

14. A method for molding a plurality of hollow foam objects, comprising:
providing a mold comprising a lower mold and an upper mold formed of a mold material, wherein the lower mold includes a first mold section connected to a second mold section and is moveable between an open position and a closed position, wherein the first and second mold sections of the lower mold each define a plurality of molding cavities, and wherein the upper mold includes a plurality of protrusions that extend into the molding cavities when the upper mold is placed on the lower mold;
loading a raw foam material into the molding cavities of the first and second mold sections when the lower mold is in the open position, wherein a dielectric constant of the raw foam material is modified via the use of one or more additives so that a modified dielectric constant of the raw foam material is substantially the same as a dielectric constant of the mold material;
placing the upper mold on the lower mold;
applying a first alternating electric field across the lower mold with the upper mold placed thereon to heat the raw foam material in the molding cavities of the lower mold and thereby form a plurality of foam pieces, wherein the protrusions of the upper mold create a hollow area in each of the foam pieces formed in the molding cavities of the lower mold;
removing the upper mold from the lower mold;
moving the lower mold from the open position to the closed position whereby the foam pieces in the molding cavities of the first mold section are aligned with the foam pieces in the molding cavities of the second mold section;
applying a second alternating electric field across the lower mold to heat bond the foam pieces in the molding cavities of the first mold section with the foam pieces in the molding cavities of the second mold section and thereby form a plurality of hollow foam objects; and
moving the lower mold from the closed position to the open position to enable unloading of the hollow foam objects from the lower mold.

15. The method of claim 14, wherein the first mold section is pivotally connected to the second mold section via a hinged connection.

16. The method of claim 14, wherein the first alternating electric field heats the raw foam material to its molding temperature in the molding cavities of the lower mold.

17. The method of claim 14, further comprising cooling the foam pieces after application of the first alternating electric field.

18. The method of claim 14, further comprising cooling the hollow foam objects after application of the second alternating electric field.

19. The method of claim 14, wherein the foam pieces are not removed from the lower mold until after the lower mold is moved from the closed position to the open position to enable unloading of the hollow foam objects from the lower mold.

20. The method of claim 14, wherein the first alternating electric field is applied in a first dielectric heating apparatus and the second alternating electric field is applied in a second dielectric heating apparatus.

21. The method of claim 14, wherein the first and second electric fields are separately applied in the same dielectric heating apparatus.

22. A method for molding a plurality of molded objects, comprising:
providing a mold that is moveable between an open position and a closed position and defines a plurality of molding cavities, wherein the mold is formed of a mold material;
loading a raw material into the molding cavities of the mold when the mold is in the open position, wherein a dielectric constant of the raw foam material is modified via the use of one or more additives so that a modified dielectric constant of the raw foam material is substantially the same as a dielectric constant of the mold material;
applying a first alternating electric field across the mold to heat the raw material in the molding cavities and thereby form a plurality of molded pieces;
moving the mold from the open position to the closed position whereby a first group of molded pieces in the molding cavities of the mold are aligned with a second group of molded pieces in the molding cavities of the mold;
applying a second alternating electric field across the mold to heat bond the first group of molded pieces with the second group of molded pieces and thereby form a plurality of molded objects; and
moving the mold from the closed position to the open position to enable unloading of the molded objects from the mold.

23. The method of claim 22, wherein the mold comprises a first mold section that is pivotally connected to a second mold section via a hinged connection.

24. The method of claim 22, wherein the first alternating electric field heats the raw material to its molding temperature in the molding cavities of the mold.

25. The method of claim 22, further comprising cooling the molded pieces after application of the first alternating electric field.

26. The method of claim 22, further comprising cooling the molded objects after application of the second alternating electric field.

27. The method of claim 22, wherein the molded pieces are not removed from the mold until after the mold is moved from the closed position to the open position to enable unloading of the molded objects from the mold.

28. The method of claim 22, wherein the first alternating electric field is applied in a first dielectric heating apparatus and the second alternating electric field is applied in a second dielectric heating apparatus.

29. The method of claim 22, wherein the first and second electric fields are separately applied in the same dielectric heating apparatus.

* * * * *